United States Patent [19]

Siew

[11] Patent Number: 4,833,443
[45] Date of Patent: May 23, 1989

[54] PORTABLE VEHICLE SIGNAL FLAG AND WARNING FLASHER

[76] Inventor: Chun Y. Siew, Box 1566, Edwardsville, Ill. 62026

[21] Appl. No.: 30,375

[22] Filed: Mar. 26, 1987

[51] Int. Cl.[4] ............................. B60Q 1/26; B60Q 1/52
[52] U.S. Cl. .................................... 340/473; 116/173; 362/80.1
[58] Field of Search ..................... 340/97, 87, 82, 107, 340/119, 321, 83, 127, 130, 84; 40/591, 592, 902; 116/28 R, 173, 202

[56] References Cited

U.S. PATENT DOCUMENTS

| | | | |
|---|---|---|---|
| 266,061 | 9/1982 | Wenzlaff | D10/114 |
| 2,684,476 | 7/1954 | Trempe | 340/321 X |
| 2,718,635 | 9/1955 | Sabiers | 340/321 X |
| 2,755,373 | 7/1956 | Berry | 340/119 X |
| 3,133,265 | 5/1964 | Fultz | 340/83 |
| 3,351,904 | 11/1967 | Noruk | 340/97 |
| 3,703,152 | 11/1972 | Morton | 116/28 R |
| 3,762,360 | 10/1973 | Hawes | 116/28 R |
| 4,002,138 | 1/1977 | Dobala | 116/28 R |
| 4,052,697 | 10/1977 | Daifotes | 340/87 |
| 4,163,426 | 8/1979 | O'Neill | 116/28 R |
| 4,259,660 | 3/1981 | Oliver | 340/120 |
| 4,375,134 | 3/1983 | Sheetz | 40/591 |
| 4,590,883 | 5/1986 | Steed et al. | 116/173 |
| 4,633,215 | 12/1986 | Anders et al. | 340/84 |

Primary Examiner—Joseph A. Orsino
Assistant Examiner—Brian R. Tumm
Attorney, Agent, or Firm—Don W. Weber

[57] ABSTRACT

A portable lightweight vehicle signal flag and warning light is presented comprising a boom which has at least one pair of opposed lenses and a slotted-block which is pivotably attached to the boom. The slotted-block slips over the vehicle window and the boom may be adjusted by tightening a transverse bolt and wing nut. Between each pair of lenses is a bulb flasher assembly which is connected to the vehicles electrical power by a cord and cigarette plug adaptor. On the the bottom of the boom is a signal flag which can display a variety of emergency or warning messages. The bulbs are made to either blink to light in a sequential fashion.

3 Claims, 3 Drawing Sheets

PORTABLE VEHICLE SIGNAL FLAG AND WARNING FLASHER

BACKGROUND OF THE INVENTION

This invention relates to portable, storable emergency flasher signals, most notably used on vehicles. Many devices have been created and are currently on sale that provide for the driver of a vehicle to signal to other vehicles on the road the emergency condition. These devices usually comprise a lettered sign of some shape or design and a means for attaching the sign. The letters usually display the words "HELP" or "OUT OF GAS" or "SEND MECHANIC". They can be seen visibly from the windows of a car, or more usually, can be displayed on the outside of a car by various means. Examples would be the emergency blinker and flag display as in Daifotes, U.S. Pat. Nos. 4,052,697 or Zdebski, 3,791,336.

SUMMARY OF THE INVENTION

It is an object of this invention to provide a compact, inexpensive, easily storable emergency warning flasher and attached signalling flag. The wand may be easily and quickly attached to a side window of a vehicle by rolling down the window and sliding the slotted block over the window. The block is attached to a rectangular or circular boom which has lenses on each side. Inside the boom are electric bulb and flasher assemblies positioned between each pair of lenses. Each electric bulb and flasher assembly is connected to a standard cigarette lighter outlet by means of a cord and cigarette lighter adapter plug. Attached to the bottom of the boom is a signal flag. The flag can have any number of messages lettered thereon, for example "SEND HELP" or "OUT OF GAS". Because the bottom of the boom in the preferred embodiment is open, the flasher assembly and bulb also illuminates the signal flag.

When not in use, the cord and and adapter plug fold into the end cap of the boom and are conventionally stored. Since the wand is compact and lightweight, it can be stored in the glove compartment or trunk of the vehicle.

DETAILED DESCRIPTION OF THE PREFERRED EMBODIMENT

Figure 1:
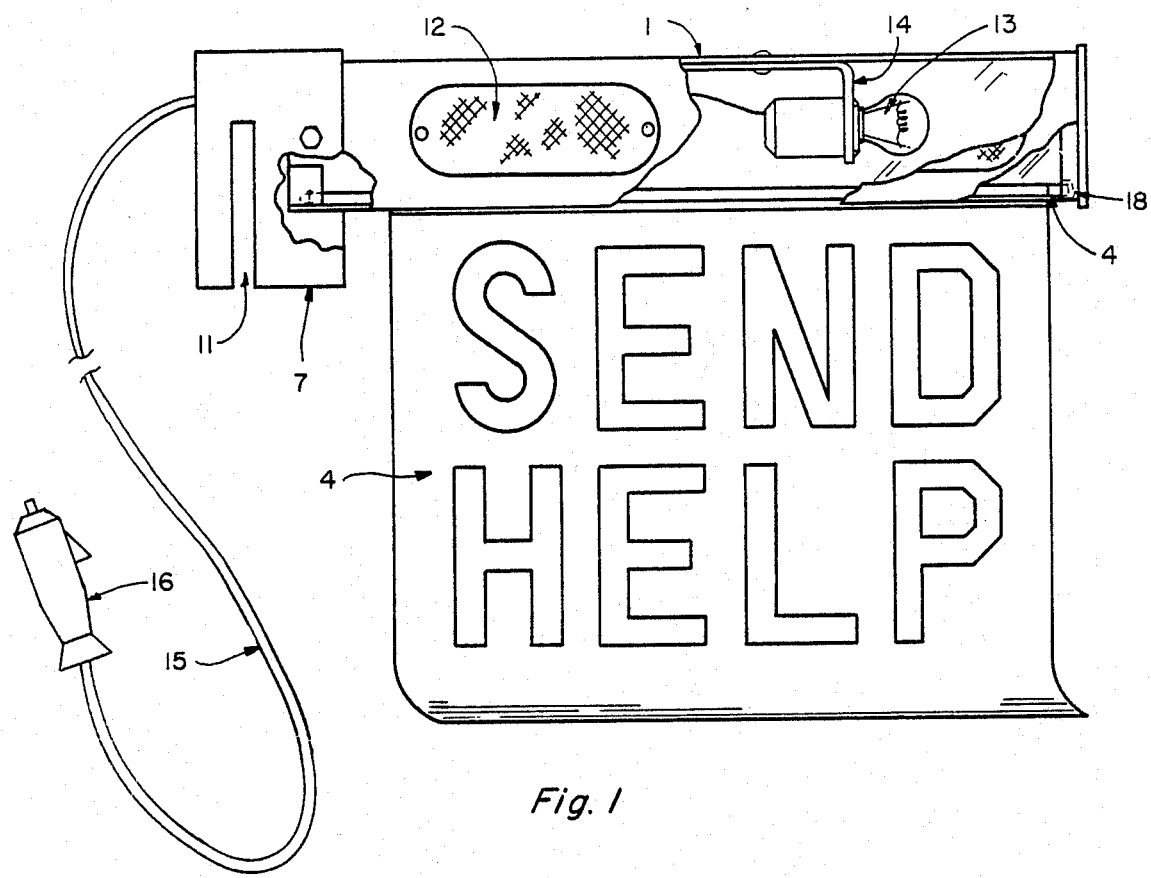
FIG. 1 shows a front view of the device with a cutaway view of the interior thereof showing the bulb-flasher assembly.
Figure 3:
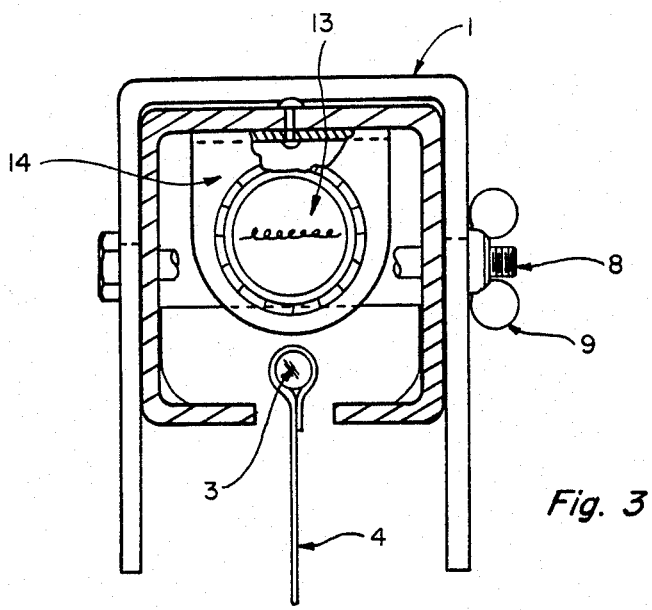
FIG. 3 is an end view of the boom showing the cross-sectional structure of the boom and details of the near-end cap.

This basic structure of Siew's Emergency Flasher Wand is the boom (1) shown in FIGS. 1 and 3. The boom has a rectangular cross-section in the preferred embodiment and can be found as stock channel from many plastics manufacturers. The boom could alternatively be made by injection molding. The boom, as the other elements, are ideally made of plastic but could just as easily be made of lightweight metal or other suitable material. While the preferred shape of the boom is rectangular, it could just as easily be round, square or any other shape. The bottom of the boom is open so that the boom consists of a horizontal top and two perpendicular sides.

Figure 2:
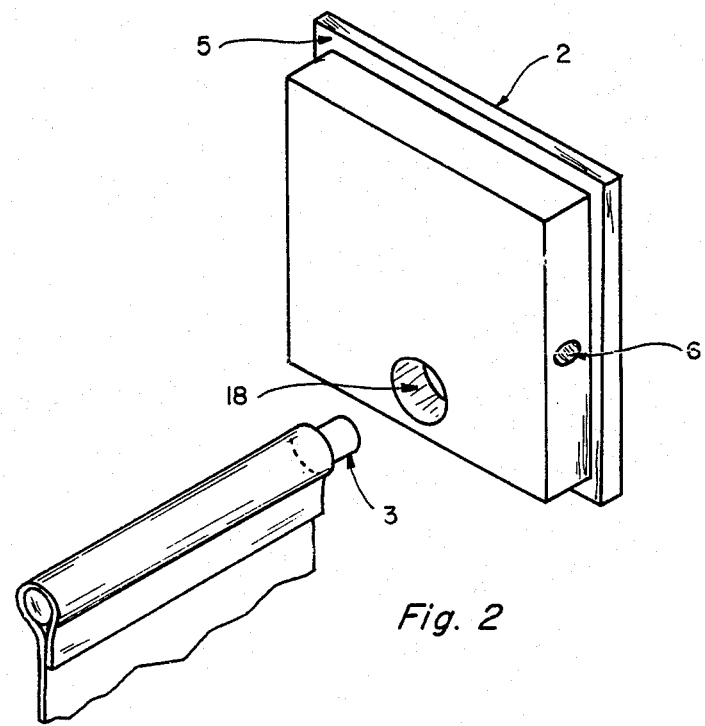
FIG. 2 shows the far end cap of the boom in detail.

Attached to the far end of the boom is the far-end cap (2) which is shown in FIG. 2. The far-end cap is essentially square in the preferred embodiment and has an indented cylindrical hole (18) near the bottom adapted to receive the rod (3) of the signal flag (4). The far-end cap has a short lip (5) about its perimeter so that the main part of the far-end cap seats inside the boom. The far end cap is snapped into place by snapping small upraised nubs in the boom into indentations in the far-end cap (6).

Attached to the near end of the boom is the near-end slotted block (7) as shown in FIG. 1. The slotted block has an inner width sufficient for the boom to fit inside of it. The slotted block is secured to the boom by means of a transverse bolt (8) and nut arrangement (9), shown in FIG. 3. In practice, the bolt and nut are made of plastic. The nut is preferrably a wing nut. The bolt and wing nut attaching means allows the user of this invention to adjust the angle of the boom after the slotted-block and boom are attached to the vehicle window. As in the far-end cap, the slotted block contains an indented cylindrical hole (18) adapted to receive the signal-flag rod.

The slotted block also contains a vertical slot (11) therein, the slot having a width so that it may pass over the width of a vehicle window.

Figure 4:
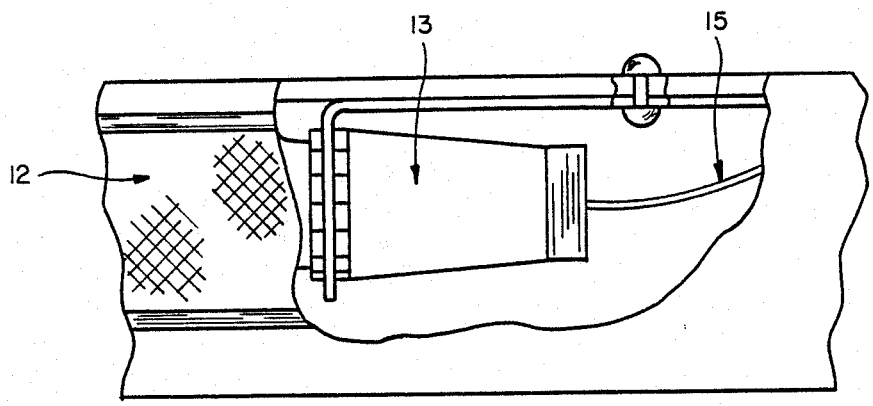
FIG. 4 shows a front cut-away detail of a section of the boom at the lens-bulb-flasher assembly bracket.

The boom itself has at least a pair of lenses (12), one lens on each vertical side of the boom. In practice, 2 pairs of lenses are used, but no reason exists why there could not be only one pair of any suitable number of pairs of lenses. In between each pair of opposing lenses there is a bulb-flasher assembly (13) shown in FIGS. 1 and 3 and schematically in FIG. 4. This bulb-flasher assembly is common and well known in the art. The assembly itself works with a thermal switch to alternately light and darken the bulbs. Each pair of lenses has a separate bulb-flasher assembly. Although not shown schematically, the bulb assembly could be hooked up electrically so as to create a strobe effect instead of a flashing effect. The strobe assembly is well-known in the art and described in the Daifotes U.S. Pat. No. 4,052,697.

Figure 5:
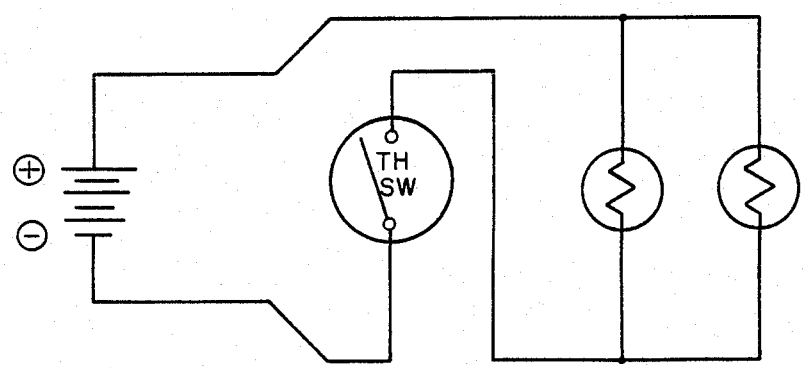
FIG. 5 is a schematic of the wiring of the bulb flasher assembly.

The schematic diagram shown in FIG. 5 demonstrate the electric circuitry for the lamps in a blinking mode. The thermal switch causes the lamps to blink on and off. Alternately, a strobe effect may be obtained in the embodiment which uses two or more pairs of lenses on the boom. A strobe effect can be created by circuitry which is well known in this particular art. In the Daifotes patent, 4,052,697 column 4 lines 20 through 29, a strobolscopic flasher light circuit is described.

The well known stroboscopic circuitry includes a standard two-stage direct-coupled flasher under the control of one side of a double-pull, double-throw switching arrangement. This stroboscopic flasher circuitry is embodied inside the boom of the instant invention. The sequential lighting effect as set out in the Daifotes patent is specifically incorporated by reference into this specification and made a part hereof.

The bulb-flasher assembly is attached to the top of the boom by means of a metal bracket (14) shown in FIGS. 1 and 3. The metal bracket is rivetted to the top of the boom, and the bulb flasher assembly is then fastened to the bracket by any appropriate means, usually a locknut or snap-collar. While the bracket is preferably made of lightweight metal such as aluminum, it could also be fashioned of plastic.

While the preferred embodiment shows a metal bracket as the attaching means for the bulb-flasher assembly, the assembly could also be attached by means of a flat base which slides into grooves cut along opposing sides of the boom. The flat base would then have a bracket attached to it, hanging down, which would then receive the bulb-flasher assembly. Many methods of attaching and securing the bulb-flasher assembly are possible and the preferred embodiment recited herein is by means of illustration and not limitation.

The final element of the electrical assembly is the cord and adapter and compartment therefore. The electrical apparatus (13) is connected to a power supply by means of a cord (15) and adapter (16) shown in FIG. 1. The adapter is commonly used in the art and is capable of plugging into a standard cigarette lighter receptacle commonly found in automobiles, trucks and other vehicles.

Figure 6:
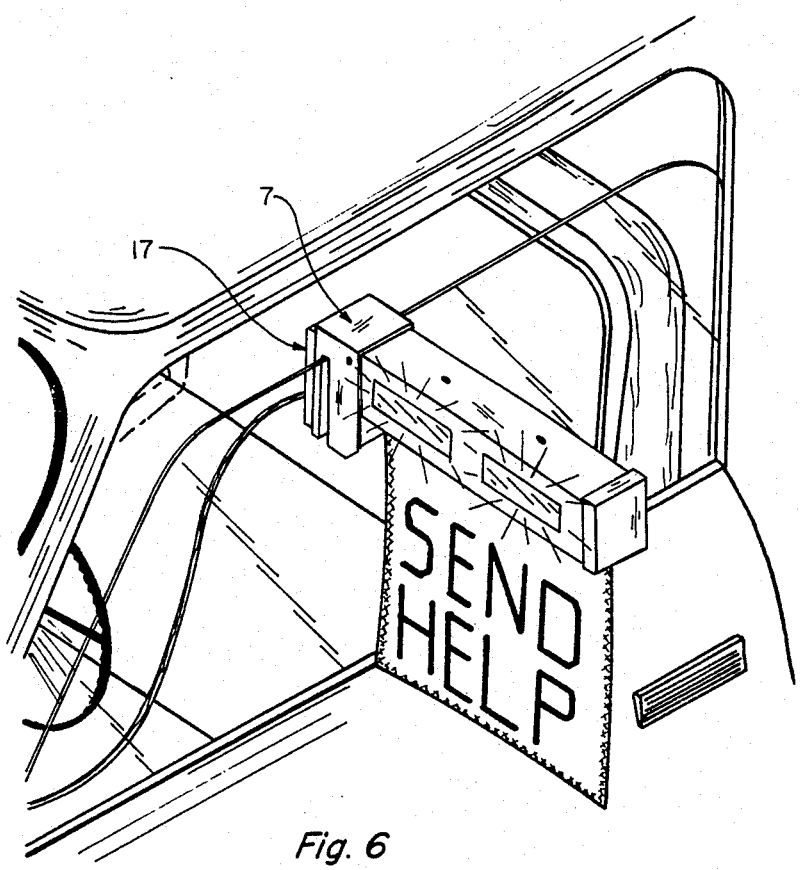
FIG. 6 is a perspective view of Siew's Wand in use on an automobile.
Figure 7:
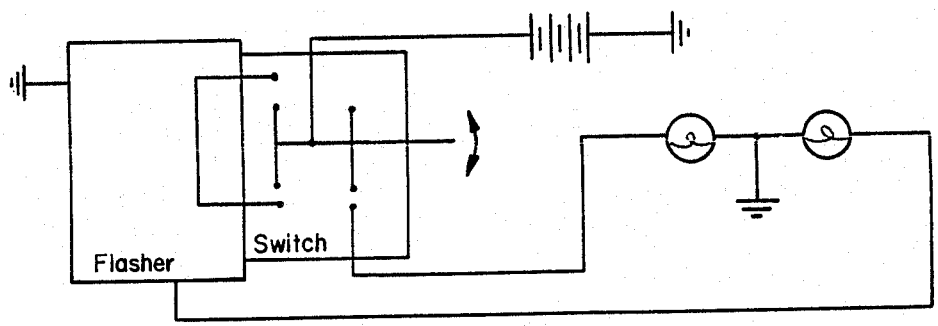
FIG. 7 is a stroboscopic circuit known to the prior art.

The slotted-block has at its end a second cap similar in size and construction to the far-end cap (2). The near-end cap (17) is positioned on the end of the slotted-block and held in place by means of raised nubs on the edge of the boom which fit into corresponding indentations on the main body of the flanged near end cap. The near-end cap also has a lip about its perimeter. The near-end cap (17) is shown in FIG. 6. The slotted-block is essentially hollow at its end. When the device is to be stored, one simply removes the near-end cap (17) from the slotted-block (7) and places the adapter plug (16) and the cord (15) inside the slotted-block. The near-end cap is then snapped in place and the device may conveniently and compactly stored. Other methods of securing both end caps to the boom may be utilized, for example, function fitting, and the method described is intended to be by way of the best embodiment and not as a limitation.

The signal flag (4) is preferably made of canvas, but could be made of a variety of suitable materials, e.g. vinyl plastic, cloth or cardboard. The signal flag has large lettering thereon. In the preferred embodiment, the lettering reads "SEND HELP", but any number of emergency or warning messages (e.g. "OUT OF GAS", "NEED MECHANIC", or "SEND AMBULANCE") could be used. The canvas flag has a loop at its top into which is inserted a wooden or metal rod (3). Once the signal flag and rod are assembled, the ends of the rod are inserted in to cylindrical holes (18) and secured thereby.

In an emergency, the device is quickly available to display the signal flag. One simply removes the near-end-cap, plugs in the adapter plug to a cigarette lighter receptacle and hangs the boom out the driver's side window by slipping the slotted block over the top of the rolled down window.

I claim:

1. A portable lightweight signal flag and warning flasher, comprising:
   (a) a boom having a pair of opposed lenses;
   (b) a lightbulb flasher assembly attached within said boom between said pair of opposed lenses;
   (c) a plug means for attaching said light bulb flasher assembly to a source of electromotive power comprising an electrical cord with a cigarette adaptor plug at the end thereof;
   (d) a hollow slotted-block pivotably attached to the near end of said boom by means of a transverse nut and bolt, further comprising a near-end cap whereby said plug means may be stored within said slotted-block;
   (e) a signal flag attached to the bottom of said boom along its longitudinal axis.

2. A portable lightweight vehicle signal flag and warning flasher, comprising:
   (a) a boom having two or more pairs of opposed lenses;
   (b) a lightbulb flasher assembly attached within said boom between each pair of opposes lenses, wherein said bulbs blink on and off;
   (c) a plug means for attaching said lightbulb flasher assembly to a source of electromotive power comprising an electrical cord with a cigarette adaptor plug on the end thereof;
   (d) a hollow slotted-block pivotably attached to the near end of said boom by means of a transverse nut and bulb, further comprising a near-end cap whereby said plug means may be stored within said slotted-block;
   (e) a signal flag attached to the bottom of said boom along its longitudinal axis.

3. A portable lightweight vehicle lag and warning flasher comprising;
   (a) a boom having two or more pairs of opposed lenses;
   (b) a lightbulb flasher assembly attached within said boom between each of pair of attached lenses wherein said bulbs light in a sequential fashion;
   (c) a plug means for attaching said lightbulb flasher assembly to a source of electromotive power comprising an electrical cord with a cigarette adaptor plug on the end thereof;
   (d) a hollow slotted-block pivotably attached to the near end of said boom by means of a transverse nut and bolt comprising a near end cap wherein the plug means may be stored within said block;
   (e) a signal flag attached to the bottom of said boom along its longitudinal axis.

* * * * *